Dec. 17, 1929.  A. BERNARD  1,739,661

ROTARY PUMP

Filed Nov. 7, 1927

Inventor
A. Bernard.
By
Attorney

Patented Dec. 17, 1929

1,739,661

UNITED STATES PATENT OFFICE

ADELARD BERNARD, OF DRUMMONDVILLE, QUEBEC, CANADA

ROTARY PUMP

Application filed November 7, 1927. Serial No. 231,456.

The present invention relates to improvements in rotary pumps, and is hereinafter fully described and claimed, and illustrated in the accompanying drawings in which: Figure 1 is a vertical longitudinal sectional view through the casing of a pump of this character.

The main object of the present invention is to provide a pump, particularly adapted for pumping milk and cream, and so devised that it will pump without stirring the milk. Another object, is to provide a pump of this type, and for the purpose above specified, which will be of very simple construction, and thus cheap to manufacture, and in which there will be few parts, which may be readily dismounted for cleaning purposes.

Like numerals of reference indicate corresponding parts in each figure.

Figure 1:
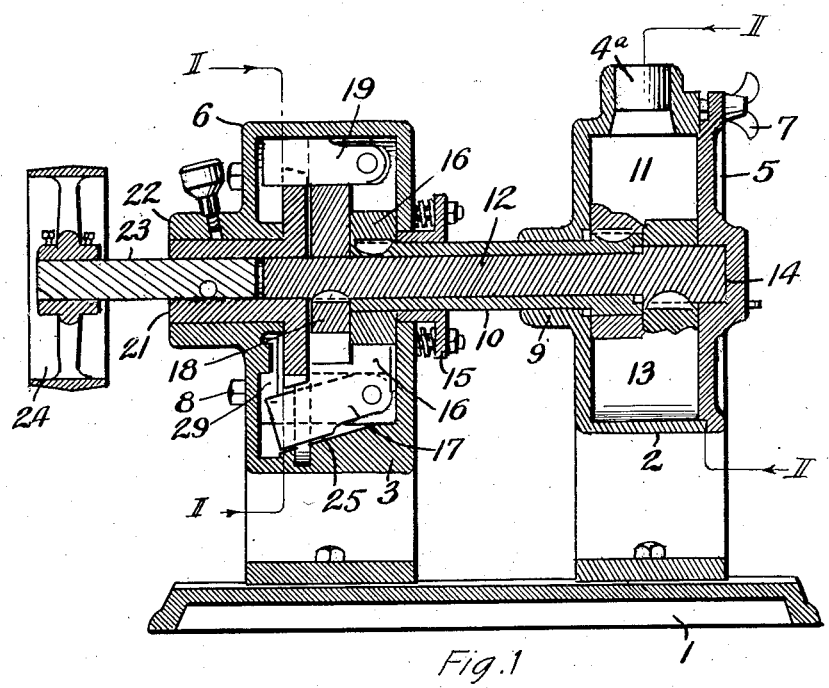

Referring to the drawings, and particularly Figure 1 of the drawings, 1 is a base upon which are respectively secured the cylindrical casings 2 and 3, and 4 and 4ª are respectively inlet and outlet openings located in the upper side of casing 2. 5 is a cover for the casing 2, and 6 is a cover for the casing 3. The cover 5 is preferably secured by means of the thumb screws 7 so as to be easily removed, while the cover 6 is secured by means of bolts 8.

In the cylindrical casing 2, is provided a hub portion 9, in which is journalled the hollow shaft 10, which projects at one end into said cylindrical casing 2, and upon which is securely mounted a pump paddle 11, and 12 is a shaft loosely mounted within said hollow shaft 10, upon one end of which is securely mounted another paddle or pumping element 13. The said shaft 12 is preferably journalled in a suitable bearing or recess 14 in the cover 5 at one end, and at its other end, said shaft extends inwardly into the casing 3, together with the hollow shaft 10, and 15 is a suitable bearing secured in the side of said casing 3, supporting said hollow shaft 10.

On the hollow shaft 10 is mounted, within said cylindrical casing 3, the rotating member 16 carrying at one end thereof the movable pawl 17, and 18 is another rotating member suitably mounted on the inner shaft 12, and carrying the movable pawl 19.

Each of said pawls 17 and 19 is rotated by means of a dented wheel 20, which is loosely mounted on the end of the inner shaft 12, and is provided with a collar 21, which is journalled in the hub 22 projecting from said cover 6, and 23 is a shaft mounted in said collar 21 and suitably keyed thereto, in the end of which is secured a pulley 24 which may readily be connected to any suitable source of power.

The pawls 17 and 19 are carried or revolved by the gear 20, one after the other. This intermittent motion is obtained by means of a recess 25, located in the bottom of the cylindrical casing 3, in which the pawl falls, each in its turn, and is held in said recess until the other pawl has partially completed one revolution.

Figure 2:
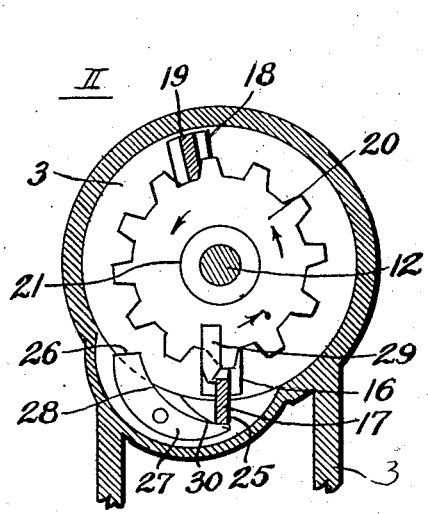
Figure 2 is a cross section, on line 2—2 of Figure 1.
Figure 3:
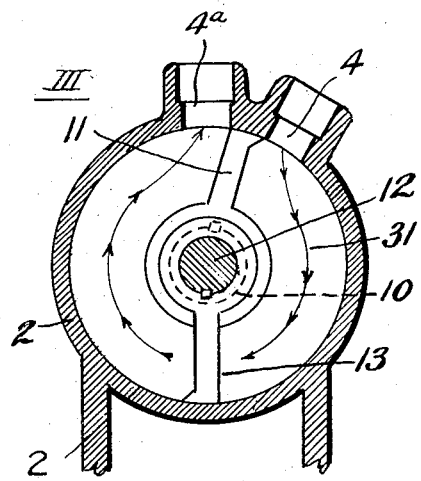
Figure 3 is a cross section, on line 3—3 of Figure 1.

For instance, as the pawl 19 illustrated in Figure 2 of the drawings, is carried by the dented wheel 20, it strikes the bevelled end 26 of the fulcrumed lever 27, thus tipping said lever 27, which in turn pushes the pawl 17 out of the recess 25 and into engagement with one of the dents of the wheel 20. In so actuating the lever 27, the pawl 19 which is still carried by the wheel 20, engages upon the curved surface 28, provided upon the lever 27, and comes in contact with the bevelled surface of the stationary member 29, which causes said pawl 19 to be released from the dented wheel 20, and directs the pawl 19 into the recessed portion 30 of the lever 27, so that the pawl 19 will abut against the wall of the recess 25, and will be held in that position, until the companion pawl 17 engages the bevelled portion 26 of the fulcrumed lever 27, thus causing the lever 27 to be tipped, which releases the pawl 19 from the recess 25.

It will be readily understood that when the shaft 12 is rotated, the shaft 10 and paddle 11 are held from rotation. Thus when the liquid to be pumped enters the inlet 4, it is carried, in the direction shown by the arrows 31, by the paddle 13, which rotates to force the liquid through the outlet opening 4ª. As the paddle 13 nears the outlet opening 4ª, the pawl 17 which controls the shaft 10, is released and is carried by the dented wheel 20, simultaneously rotating the paddle 11, which in turn, performs the same operation as the paddle 13.

It will readily be understood from the foregoing, that the device illustrated in the accompanying drawing only shows one of the preferred forms of the invention, but that alterations and amendments, may be made to the said invention, without departing from the scope and spirit of the invention.

What I claim as my invention is:

1. A rotary pump, comprising two cylindrical casings spaced apart, one of said casings having inlet and outlet openings therein; a hollow shaft suitably journaled in said casing; a paddle mounted on said hollow shaft; an inner shaft rotatably mounted within said hollow shaft; a paddle mounted on the end of said inner shaft; pawls mounted, respectively, on each of said hollow and said inner shaft; and a dented wheel to engage alternatively each of said pawls, said dented wheel loosely mounted on inner shaft; substantially and for the purpose specified.

2. A pump of the character described, comprising a casing, inlet and outlet openings therein; a removable cover for one end of said casing; a hollow shaft extending into said casing and having its outer end journaled in said removable cover; an inner shaft rotatably mounted within said hollow shaft; paddles mounted on said hollow and inner shafts; a pawl mounted on each of said shafts, and means for rotating said shafts intermittently, said means comprising a dented wheel and a fulcrumed lever, substantially as described.

3. A rotary pump comprising two substantial cylindrical casings; a hollow shaft journaled in said casings; an inner shaft rotatably mounted within said hollow shaft; paddles repectively mounted on each of said hollow and inner shafts; pawls respectfully mounted on said hollow and inner shafts; a dented wheel mounted on said inner shaft; and a recess in the walls of one of said aforementioned casings and a fulcrumed lever mounted in said recess, substantially and for the purpose specified.

Signed at Montreal, Quebec, Canada, this 22nd day of January, 1927.

ADELARD BERNARD.